United States Patent

McQueen et al.

Patent Number: 5,111,692
Date of Patent: May 12, 1992

[54] TEMPERATURE COMPENSATED LIQUID LEVEL AND FLUID FLOW SENSOR

[75] Inventors: Malcolm M. McQueen, Fallbrook; David J. Allen, San Marcos, both of Calif.

[73] Assignee: Fluid Components, Inc., San Marcos, Calif.

[21] Appl. No.: 656,568

[22] Filed: Feb. 14, 1991

Related U.S. Application Data

[63] Continuation-in-part of Ser. No. 499,948, Mar. 27, 1990, abandoned.

[51] Int. Cl.⁵ .................... G01F 23/24; G01F 1/68
[52] U.S. Cl. .................... 73/295; 73/204.17; 73/204.19
[58] Field of Search ............... 73/295, 204.11, 204.14, 73/204.17, 204.19; 364/510; 340/620, 606

[56] References Cited

U.S. PATENT DOCUMENTS

| | | | |
|---|---|---|---|
| 3,111,031 | 11/1963 | Kuritza | 73/295 |
| 3,372,590 | 3/1968 | Sterling | 73/204.19 |
| 3,479,875 | 11/1969 | Riddel | 73/295 |
| 3,485,100 | 12/1969 | Petersen | 73/295 |
| 3,719,083 | 3/1973 | Morris et al. | 73/204.17 |
| 3,745,827 | 7/1973 | Swanson et al. | 73/233 |
| 3,803,913 | 4/1974 | Tracer | 73/204.17 |
| 3,891,391 | 6/1975 | Boone | 73/204.19 |
| 4,053,874 | 10/1977 | Glaser | 340/244 R |
| 4,116,045 | 9/1978 | Potter | 73/61.1 R |
| 4,163,391 | 8/1979 | Bezard et al. | 73/295 |
| 4,326,199 | 4/1982 | Tarpley et al. | 340/622 |
| 4,356,728 | 11/1982 | Gomez | 73/295 |
| 4,361,037 | 11/1982 | Hauschild et al. | 73/295 |
| 4,494,406 | 1/1985 | Komons et al. | 73/204 |
| 4,513,615 | 4/1985 | Sato et al. | 73/204 |
| 4,513,616 | 4/1985 | Bezard et al. | 73/295 |
| 4,525,850 | 6/1985 | Miller | 377/19 |
| 4,532,799 | 8/1985 | O'Neill | 73/295 |
| 4,619,140 | 10/1986 | Kuhnel | 73/295 |
| 4,633,491 | 12/1986 | Kuhnel | 377/20 |
| 4,640,127 | 2/1987 | Schneider | 73/295 |
| 4,825,383 | 4/1989 | Ory | 364/509 |
| 4,853,637 | 8/1989 | Endres | 324/439 |
| 4,854,167 | 8/1989 | Czarnocki et al. | 73/204.19 |
| 5,031,126 | 7/1991 | McCulloch et al. | 73/295 |

FOREIGN PATENT DOCUMENTS

| | | | |
|---|---|---|---|
| 104515 | 6/1984 | Japan | 73/295 |
| 2120482 | 11/1983 | United Kingdom | 73/295 |

Primary Examiner—William A. Cuchlinski, Jr.
Assistant Examiner—Diego F. F. Gutierrez
Attorney, Agent, or Firm—Baker, Maxham, Jester & Meador

[57] ABSTRACT

A temperature compensated, self-heating, resistance thermal detector in a sensor circuit for determining fluid level or fluid flow. A resistor in shunt with the detector provides the temperature compensation. The resistor and the thermal detector are connected between electrical input and output lines. Alternative embodiments include a speed enhancing lead network and a fully automated circuit under microprocessor control.

27 Claims, 3 Drawing Sheets

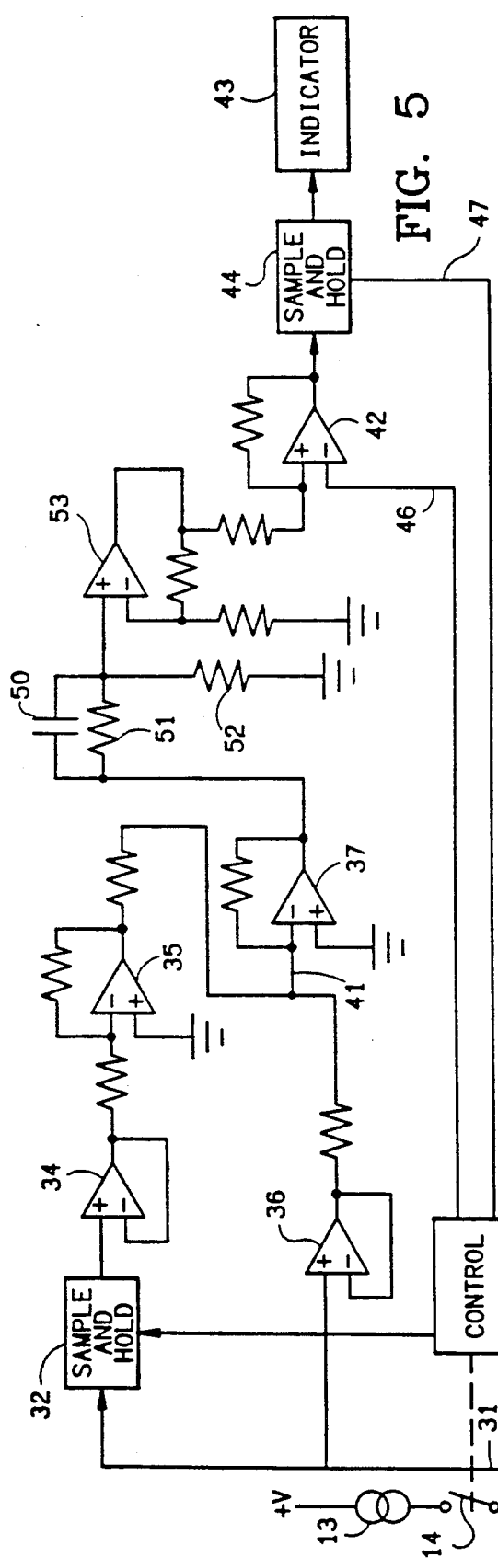
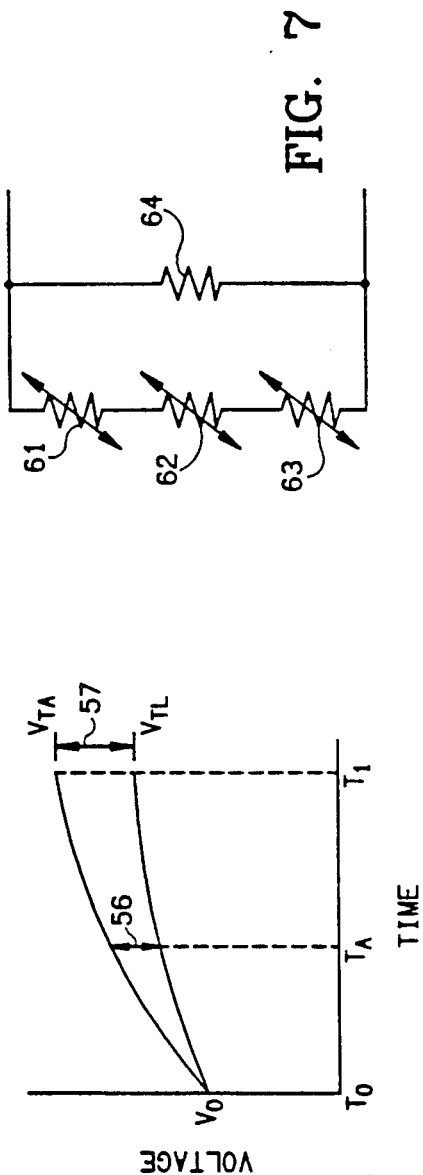
FIG. 5
FIG. 6
FIG. 7

TEMPERATURE COMPENSATED LIQUID LEVEL AND FLUID FLOW SENSOR

CROSS REFERENCE TO RELATED APPLICATION

This is a continuation-in-part of application Ser. No. 07/499,948, filed Mar. 27, 1990 now abandoned.

FIELD OF THE INVENTION

This invention relates generally to fluid level and flow sensing and more particularly to a circuit having as a key component a temperature compensated, self-heating, resistance thermal detector or other heat sensitive device.

BACKGROUND OF THE INVENTION

There are many examples of apparatus, circuits and systems employing a temperature dependent resistance element in connection with monitoring the liquid level in a container. Many of these are relatively complex, especially in their attempts to provide temperature compensation to improve the accuracy of the sensor system. One example of such a device is shown in U.S. Pat. No. 4,361,037. This employs a temperature sensitive resistance element having different resistance values in different portions of its linear dimension. This is stated as a means for compensating for the change in level of liquid due to its thermal expansion. One of the primary concerns of that patent is to compensate for the variation in heat transferred from the sensor to the liquid as a function of the initial temperature.

United Kingdom patent b 2,120,482 is another example of a complex liquid level system employing a plurality of discrete thermistors for an automobile fuel tank. A flowmeter is an indispensable part of that system. Temperature compensating resistors are not employed.

U.S. Pat. No. 4,633,491 concerns a circuit for electro thermal level measurement with ambient temperature compensation by means other than resistors in parallel with the temperature sensitive resistor.

U.S. Pat. No. 3,111,031 relates to another automobile fuel gauge liquid level measurement. It includes a thermistor to compensate for ambient temperature in some unspecified way.

U.S. Pat. No. 3,485,100 shows an external heater for heating an elongated temperature sensitive element in a liquid level measurement system. Alternatively, a series of discrete temperature sensitive resistors are heated by the separate heating element. A temperature compensating resistor is connected as one leg of a bridge circuit.

United Kingdom patent publication 2,120,482 shows several thermistors, each having a parallel connected resistor. The purpose of these resistors is to limit the voltage drop across a dry thermistor to make the circuit more linear. There is no purpose of temperature compensation for these resistors. As a matter of fact, the resistance vs. temperature characteristics of thermistors is so nonlinear and different from RTD's that it is highly unlikely that they could be temperature compensated in the manner taught herein by applicants.

Other examples of generally relevant sensor apparatus, without effective temperature compensation, are shown in U.S. Pat. Nos. 4,356,728 and 4,619,140.

The resistance of a temperature dependent resistive sensor increases as the temperature it is sensing increases so that when the sensor is energized by a constant current source, the power it dissipates also increases. This power dissipation results in additional or enhanced heating of the resistive sensor. In an uncompensated system using such a sensor, the cooling effect of the fluid increases as the sensor temperature increases due to this additional power dissipation effect and due also to higher ambient temperature. When considering the output of the uncompensated sensor, these effects (heat caused by increased power dissipation and cooling from the surrounding fluid) function in the opposite manner, but do not precisely or adequately compensate each other. Specifically, the rise in sensor resistance will be the predominant factor so sensor output will rise as temperature increases. This will cause the instrument to give an erroneous output at other than calibration temperature. These are among the factors which give rise to a number of complex attempts at accurate temperature compensation which have been the purpose of some previous patents.

SUMMARY OF THE INVENTION

Broadly speaking, this invention provides a very simple yet effective temperature compensation means for a resistance thermal detector (RTD) sensor where the RTD is self-heated and provides its own reference voltage reading for comparison with the measurement reading. The invention is not limited to the specific use of RTD's but may employ other temperature sensitive components.

In its simplest form, the sensor of the invention comprises a temperature compensating resistor connected in parallel with the RTD, the parallel combination being powered by a source of constant current. An appropriate voltage measuring device such as a voltmeter is connected across the parallel combination. The reference or the initial voltage reading is taken as soon as the switch is closed and the circuit is completed. A measurement temperature voltage is taken at some appropriate time, such as 30 seconds later. The readings are compared, the heating current is removed and the RTD is then allowed to return to a reference temperature level. This process is repeated so that the liquid level in the container is constantly being monitored. The use of a shunt resistor for temperature compensation in this invention is much simpler than in previous proposals. Despite its simplicity this arrangement has been shown to be effective over a temperature range of −65° F. to 400° F.

In an alternative embodiment a constant voltage is employed with a series connected compensating resistor.

An automated system for determining liquid level with a self-heated RTD is also disclosed where the output provided is a visual or audible indication or both. This circuit also incorporates a lead network to speed up the response time of the sensor.

BRIEF DESCRIPTION OF THE DRAWING

The objects, advantages and features of the invention will be more readily perceived from the following detailed description, when read in conjunction with the accompanying drawing, in which:

FIG. 5 is a diagram of an automated system of the invention incorporating an optional lead network;

FIG. 6 is a voltage diagram similar to FIG. 3A showing the effect of the lead network;

FIG. 7 shows a portion of a circuit diagram similar to FIG. 1, where the sensor comprises several discrete elements;

DESCRIPTION OF THE PREFERRED EMBODIMENTS

Figure 1:
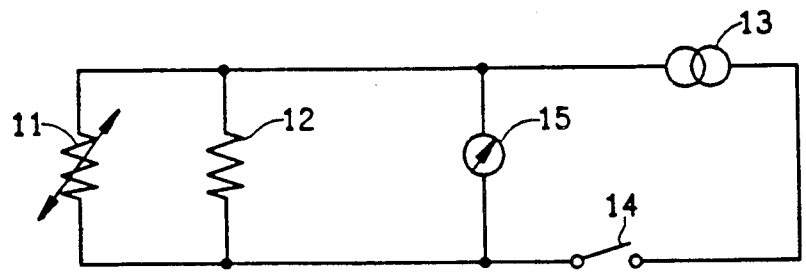
FIG. 1 shows the basic circuit diagram of the invention.

With reference now to the drawing, and more particularly to FIG. 1 thereof, there is shown RTD 11 in parallel with resistor 12. For purposes of example, the resistance range of RTD 11 is typically 30 to 100 ohms at calibration temperature, rising to around 200 ohms at maximum expected temperature. Shunt resistor 12 may have a resistance of 1750 ohms. Connected in series with the parallel combination of the two resistors is constant current source 13, together with switch 14. Meter 15 is connected across the RTD to provide readings indicative of the type of fluid in which the RTD is immersed. RTD 11, represented by the two-way variable resistance symbol, may be, in an alternative embodiment, an elongated continuous resistance element, preferably oriented normal to the fluid surface, to enable this single element to detect varying liquid level changes. With appropriate electronic calibration, the element could be oriented at an angle. More importantly, this same element may be employed to detect varying fluid flow changes. RTD 11 is preferably a point sensor and the discussion herein will generally be directed to that embodiment. The symbol of RTD 11 is appropriate for the element described herein.

Figure 3A:
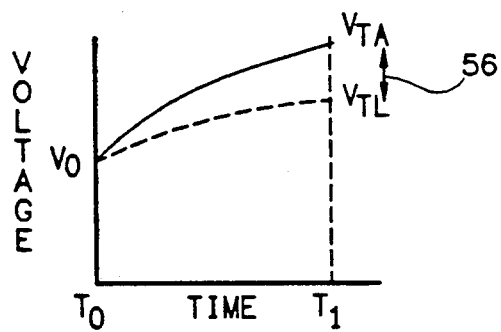
FIG. 3A is a voltage diagram showing the effects of different surrounding substances on the RTD for a given current excitation.
Figure 3B:
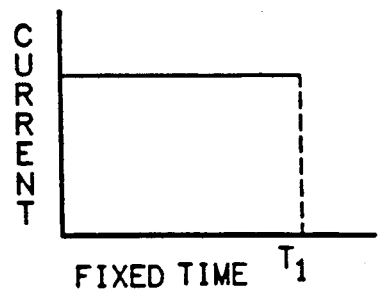
FIG. 3B is the current diagram corresponding with the voltage diagram of FIG. 3A.

The operation of the circuit of FIG. 1 is more easily understood with reference also to FIGS. 3A and 3B. When switch 14 is open, there is no voltage across RTD 11. At time $T_0$ the switch is closed and the initial voltage across the RTD is $V_0$. The actual value of this voltage is relatively unimportant. It depends upon the level of current provided by current source 13 and the resistances of RTD 11 and resistor 12. If the RTD is in air, at time $T_1$ the resistance of the RTD will have increased so that the voltage across it, $V_{TA}$, will have risen to the level shown in FIG. 3A. If the RTD is immersed in a liquid the voltmeter will have a reading of $V_{TL}$. This indicates that the liquid level in the container which the circuit of FIG. 1 is monitoring has reached the level at which the RTD is physically mounted. Notice that this voltage, with the same current application for the same period of time (FIG. 3B), is substantially less than the voltage level across the RTD when it was in air. Typically time $T_1$ could be approximately 30 seconds after time $T_0$. It would then take about 90 seconds after switch 14 is opened for the RTD to return to ambient temperature so the cycle can be repeated. This would result in a two minute duty cycle where a new reading from the RTD would be available every two minutes. Switch 14 may be operated manually or automatically under control of a simple timer, which is not shown in FIG. 1.

Figure 4A:
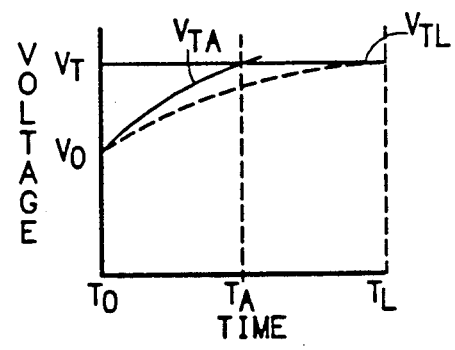
FIG. 4A is a voltage diagram employing a fixed target voltage for the heated RTD.
Figure 4B:
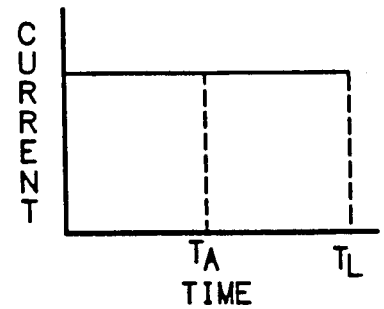
FIG. 4B is the current diagram for the voltage diagram of FIG. 4A.

As an alternative operating mode, meter 15 may have a setpoint which will give an indication such as a audible tone or illuminate a light when that predetermined voltage level is reached. FIG. 4A shows the preset voltage as $V_T$ and indicates that the voltage across the RTD reaches $V_T$ much faster in air than it does in liquid, with a constant current applied. In this preferred mode, the operative parameter is not voltage but time so if the setpoint voltage is reached in time $T_A$ the operator knows that the RTD resides in air and not in liquid. If the $V_T$ is reached in time $T_L$ the operator knows that the sensor is immersed in liquid. It can be appreciated that there is an alternative operational condition wherein for a preselectable value of $V_T$, between $V_{TA}$ and $V_{TL}$, an infinite time period can pass and the voltage reading never reaches the preselected $V_T$. In that case, voltage is the operative value and if $V_{TL}$ never reaches that $V_T$ value, the operator knows the sensor is in liquid. FIG. 4B reflects the time at constant current for the potential readings in FIG. 4A.

Figure 2:
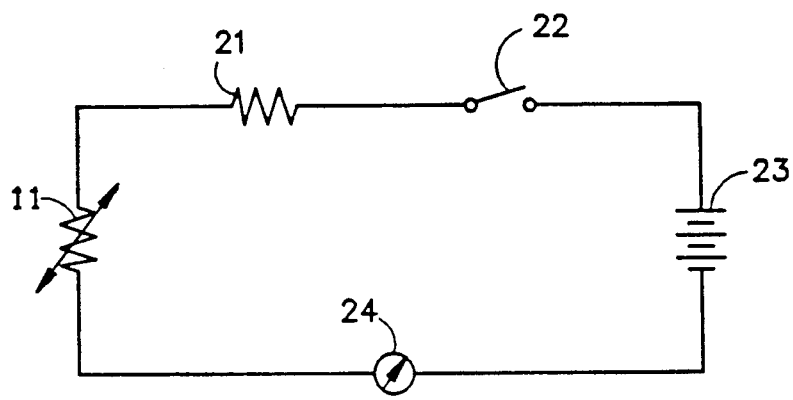
FIG. 2 is an alternative circuit arrangement using a constant voltage source.

The FIG. 2 circuit incorporates components similar to those shown in FIG. 1, with the difference being that it is a series circuit powered by a constant voltage. Sensor 11 is the same. Compensating resistor 21, switch 22, voltage source 23 and ammeter 24 complete the temperature compensated series circuit. With this arrangement, the phenomenon measured would be current, requiring the compensating resistor to be in series with the RTD rather than in parallel. This combines the two temperature related resistance modifying effects previously discussed in an additive way instead of in a bucking manner, as with the constant current source.

The function of shunt resistor 12 can be explained relatively easily. The resistance of resistor 12 is constant with temperature so that with a constant current applied and with the RTD having an increasing resistance with temperature, more current flows through resistor 12 as temperature increases. Thus it is referred to as a temperature compensating resistor. For example, for expository purposes, if the RTD and the shunt resistor both have a value of 1750 ohms at time $V_0$, half the current will flow through each resistance. Of course, the voltage across each of these resistances is always equal since they are in a parallel combination. If the resistance value of the RTD doubles, the current through it would be cut to one-third whereas the current through resistor 12 would increase to two-thirds. At the same time, the voltage across the combination would normally increase with a constant current. When the resistance connected to a constant current increases, the power dissipated also increases. By use of the shunt compensating resistor, the total power dissipated across the parallel combination is reduced compared with what it would be across the increasing resistance RTD alone. By means of this simple shunt resistor, temperatures ranging from $-65°$ F. to approximately $400°$ F. are adequately compensated without the need of further complex circuitry or additional components. Note that the RTD resistance is actually much smaller than the value used for this example, but this made the explanation easier.

A circuit for automating the operation of the self-heated RTD is shown in FIG. 5. The basic setup of constant current source 13, switch 14, temperature compensating shunt resistor 12 and RTD 11 are unchanged. Line 31 is the point at which the voltage across the RTD is measured and is connected to sample and hold circuit 32. The output of sample and hold 32 is fed to amplifier 34 and then through inverter 35 to line 41. The signal on line 31 is also fed through amplifier 36 to line 41 where these two signals are applied to summing amplifier 37.

Assuming the FIG. 5 circuit includes a lead network, the output of amplifier 37 is fed to the input of the lead network. This network functions in a manner to speed up the response of the circuit when the fluid temperature sensed by the RTD is changing relatively rapidly. The gain of amplifier 53 is configured to equal the attenuation of the divider network comprised of resistors 51 and 52 so that at DC the net gain of the lead network is unity. However, if the input to the lead network is changing relatively rapidly, such as a few millivolts per second, corresponding to a process temperature change being sensed of, for example, 2° F. per second, capacitor 50 tends to make the voltage at the input of amplifier 53 closely follow the voltage at the network input. This follows from the fact that voltage across a capacitor cannot be changed instantly. Under these circumstances of change, the effective gain of the network is greater than unity, causing the output of amplifier 53 to change more rapidly than the input to the lead network, thereby increasing the sensitivity of the instrument. The final purpose of this circuit is to increase the difference in apparent output signal change between liquid and gas.

The effect of the lead network can be seen graphically in FIG. 6, when compared with FIG. 3A. At time $T_1$ in FIG. 3A, the differential between $V_{TL}$ and $V_{TA}$ is represented by the length of arrow 56. With the lead network, the same output differential will be reached more quickly, as represented by arrow 56 at time $T_A$ in FIG. 6. By the time $T_1$ has been reached, the difference between $V_{TL}$ and $V_{TA}$ is much larger, as represented by contrasting length, of arrow 56 compared to arrow 57. This output of the lead network (or amplifier 37 if the lead network is not included) is applied to one input of comparator 42. The other input is a setpoint input and provides the signal level with which the measurement comparison is made. The output of comparator 42 then goes to a second sample and hold circuit 44. The entire circuit is subject to control block 45, which may be a microprocessor, and which provides the necessary functional control for the circuit of FIG. 5.

A timer within control 45 cycles switch 14 which may either be a mechanical switch or an electronic switch. At $T_0$ switch 14 is closed, current flows through RTD 11 and the voltage is developed across it. Immediately thereafter, possibly as little as one-tenth of a second after switch 14 is closed, sample and hold 32 is switched to the HOLD mode. Current continues to pass through RTD 11, heating it up and at a specified time thereafter, which may be approximately 30 seconds, sample and hold 44, which has been holding the previous reading, is set momentarily to SAMPLE and then back to HOLD.

A lead network could also be employed to reduce the 30 seconds referred to above so that a faster cycle time can result.

An operator modifiable setpoint has been applied to comparator 42 over line 46 from control 45. Thus the output of sample and hold circuit 44 will be indicated on indicator 43 as the difference between the setpoint and the summed initial and final measurement voltage values from sample and hold circuits 32 and 44. As soon as sample and hold 44 has been set to HOLD, sample and hold circuit 32 is again set to SAMPLE and switch 14 is opened. After approximately 90 seconds have elapsed, to allow RTD 11 to return to ambient temperature, the cycle is repeated.

Figures 8, 9:
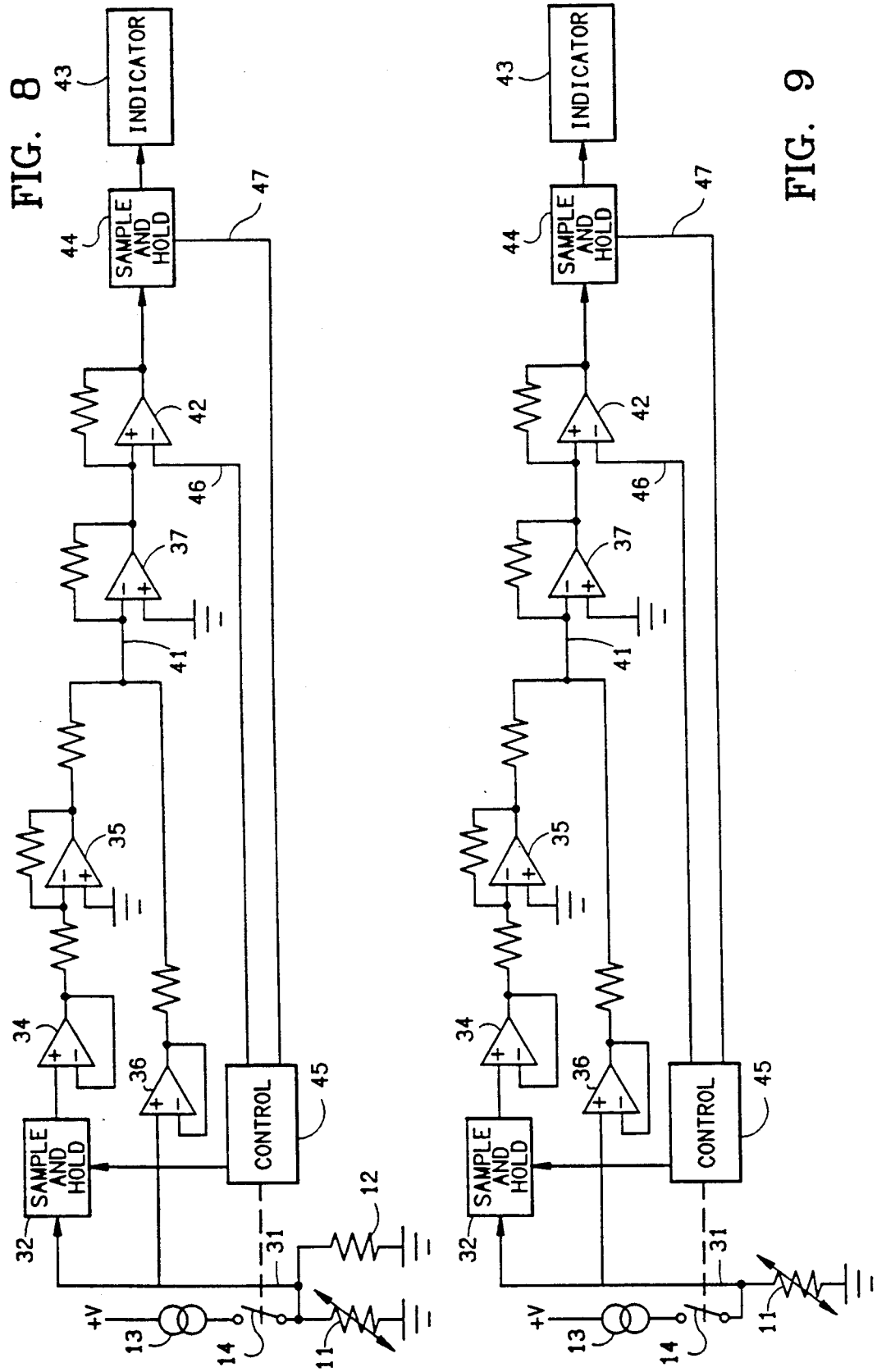
FIG. 8 is a diagram of an automated system of the invention without the lead network of FIG. 5.
FIG. 9 is a diagram of an automated system of the invention, similar to FIG. 8, specifically configured for sensing fluid flow.

As stated previously, the lead network is optional in the FIG. 5 circuit. Operation of the circuit without the lead network would be the same as described above, except that it would not achieve the signal shown in FIG. 6. The automated circuit without the lead network is shown in FIG. 8. Operation of this circuit has been adequately discussed and need not be further detailed here.

The circuit as shown and described is designed for use with a short or point level sensor or flow switch 11. For the alternative continuous RTD, that is, an elongated sensor device rather than a point sensor, when used as a level sensor or as a flowmeter, comparator 42 would be replaced by a linearizer or other means for signal conditioning. A continuous RTD may be used to cover a range of levels which are desired to be sensed. The signal for a partially immersed elongated sensor would be between the air and liquid signals. With proper conditioning this output would provide a measure of liquid level.

For flow sensing the fluid would be allowed to flow past the sensor, thereby cooling it and depressing the signal. With proper conditioning the amount of signal depression would be a measure of mass flow. Any of the sensors of FIGS. 1, 2, 5 or 8 could be used to sense fluid flow. The embodiment of FIG. 9 is specifically configured to sense fluid flow. It functions in the manner of the circuits of FIGS. 5 and 8, except that it does not utilize the shunt resistor 12.

An alternative embodiment is shown in FIG. 7, where a plurality of point sensors 61, 62, and 63 are in shunt with a single temperature compensating resistor 64. This modified sensor portion does not require changes in the rest of the sensing circuit. By using several point sensors more than one liquid level can be detected. This modification can be employed in any of the circuit configurations shown in the drawing.

In view of the above description, it is likely that modifications and improvements will occur to those skilled in the art which are within the scope of the accompanying claims.

What is claimed is:

1. A method for detecting liquid level and fluid flow employing a circuit comprising an electrical input line and an electrical output line, a resistance temperature detector (RTD) having a variable resistance related to temperature connected between the input and output lines, a fixed value temperature compensating resistor connected between the input and output lines in parallel with the RTD, the parallel combination being selectively coupled through the input line to a constant current source through a selectively actuable switch, and voltage sensing means connected between the input and output lines across the parallel combination, said method comprising the steps of:

closing the switch and taking a reference voltage reading at initial process temperature;

self heating the RTD for a first predetermined period of time with current from the constant current source;

shunting increasing amounts of current through the fixed value temperature compensating resistor as the resistance of the RTD increases with temperature, thereby reducing the amount of power dissipated in the RTD in relation to the total power dissipated in the parallel combination;

taking a measurement temperature voltage reading at the end of the first predetermined period;

comparing the reference voltage with the measurement temperature voltage, a large temperature differential within a predetermined differential range indicated that the liquid level has not reached the RTD or that there is no or low fluid flow, a relatively smaller temperature differential within a second predetermined differential range indicating that the liquid level has reached the RTD or that there is significant fluid flow; and opening the switch to remove heating current from the RTD and to allow the RTD to return to a reference temperature.

2. The method recited in claim 1, and comprising the further step of periodically monitoring the liquid level or fluid flow by repeatedly closing the switch for the predetermined period of time and taking the comparison voltage readings.

3. A sensor for detecting liquid level and fluid flow, said sensor comprising:
   an electrical input line;
   an electrical output line;
   a resistance component having a variable resistance related to temperature connected between said input and output lines;
   a temperature stable, temperature compensating resistor of fixed resistance value connected between said input and output lines in parallel with said resistance component;
   a constant current source for applying current to said parallel combination of said resistance component and said compensating resistor through said input line; and
   switch means for selectively coupling said constant current source to said parallel combination and causing self heating of said resistance component.

4. The sensor recited in claim 3, wherein said compensating resistor has a resistance value at least an order of magnitude greater than the resistance of said resistance component at calibration temperature.

5. The sensor recited in claim 3, wherein said compensating resistor has a resistance value in the range of six to ten times that of said resistance component at its maximum resistance value.

6. The sensor recited in claim 3, and further comprising means for providing an indication representative of the voltage across said parallel combination.

7. The sensor recited in claim 3, wherein said resistance component is a resistance temperature detector (RTD).

8. The sensor recited in claim 7, herein said RTD comprises a point sensor.

9. The sensor recited in claim 7, wherein said RTD comprises a plurality of point sensors.

10. The sensor recited in claim 7, wherein said RTD comprises an elongated continuous sensor.

11. A sensor for detecting liquid level and fluid flow, said sensor comprising:
   an electrical input line;
   an electrical output line;
   a resistance temperature detector (RTD) having a variable resistance related to temperature connected between said input and output lines;
   a temperature stable, temperature compensating resistor of fixed resistance value connected between said input and output lines in parallel with said RTD, said compensating resistor having a resistance value at least an order of magnitude greater than the resistance of said RTD at calibration temperature;
   a constant current source for applying current through said input line to said parallel combination of said RTD and said compensating resistor and causing self heating of said RTD;
   switch means for selectively coupling said constant current source to said parallel combination; and
   means for providing an electrical signal representative of the voltage across said parallel combination.

12. A sensor for detecting liquid level and fluid flow, said sensor comprising:
   an electrical input line;
   an electrical output line;
   a resistance temperature detector (RTD) having a variable resistance related to temperature connected between said input and output lines;
   a temperature stable, temperature compensating resistor of fixed resistance value connected between said input and output lines in parallel with said RTD;
   a constant current source for applying current to said parallel combination of said RTD and said compensating resistor;
   means for selectively connecting said constant current source to said parallel combination and causing self heating of said RTD;
   first sample and hold circuit means having an output and being connected to said RTD to detect initial voltage thereon;
   amplifier means having an output;
   means for connecting the output of said first sample and hold circuit means for said amplifier means;
   comparator means having an output and having an input connected to said output of said amplifier means;
   means for applying a reference voltage to said comparator means with which the output from said amplifier means in compared;
   second sample and hold circuit means connected to said output of said comparator means to detect the difference between the initial voltage and the voltage on said RTD at a time after said RTD is heated and subjected to the fluid being sensed;
   indicator means coupled to said output of said second sample and hold circuit means; and
   control means for controlling the timing of the operation of said first and second sample and hold means and said selective connecting means, and for providing said reference voltage to said comparator.

13. The sensor recited in claim 12, wherein said compensating resistor has a resistance value at least an order of magnitude greater than the resistance of said RTD at calibration temperature.

14. The sensor recited in claim 12, wherein said compensating resistor has a resistance value in the range of six to ten times that of said RTD at its maximum resistance value.

15. The sensor recited in claim 12, and further comprising means for providing an indication representative of the voltage across said parallel combination.

16. The sensor recited in claim 12, wherein said RTD comprises a point sensor.

17. The sensor recited in claim 12, wherein said RTD comprises a plurality of point sensors.

18. The sensor recited in claim 12, wherein said RTD comprises an elongated continuous sensor.

19. The sensor recited in claim 12, and further comprising a lead network connected between said amplifier means and said comparator means, said lead network comprising:
   second amplifier means having at least one input and an output;
   voltage divider means connected to one said input of said second amplifier means, said voltage divider means comprising at least two legs; and
   capacitor means connected across one leg of said voltage divider means, the output of said second amplifier means being connected to an input of said comparator means.

20. The sensor recited in claim 19, wherein the gain of said second amplifier means is configured to equal the attenuation of said voltage divider means so that at DC the net gain of said lead network is unity.

21. A sensor for detecting liquid level and fluid flow, said sensor comprising:
   an electrical input line;
   an electrical output line;
   a source of electrical power;
   a resistance component having a variable resistance related to temperature connected between said input and output lines in circuit with said source of electrical power;
   a fixed resistance value resistor connector in combination with said resistance component between said input and output lines with said source of electrical power in a manner to function as a temperature compensating resistor; and
   switch means for selectively coupling said source of power to said resistance component and said resistor and causing self heating of said resistance component, excess power caused by said self heating being dissipated by said resistor so that said resistance component can give readings accurately relating to liquid level and fluid flow.

22. The sensor recited in claim 21, wherein:
   said temperature compensating resistor is connected in parallel with said resistance component; and
   said source of power is a constant current source.

23. A sensor for detecting fluid flow, said sensor comprising:
   an electrical input line;
   an electrical output line;
   a resistance temperature detector (RTD) having a variable resistance related to temperature connected between said input and output lines;
   a constant current source for applying current to said RTD through said input line;
   means for selectively connecting said constant current source to said RTD and causing self heating of said RTD;
   first sample and hold circuit means having an output and being connected to said RTD to detect initial voltage thereon;
   amplifier means having an output;
   means for connecting the output of said first sample and hold circuit means to said amplifier means;
   comparator means having an output and having an input connected to said output of said amplifier means;
   means for applying a reference voltage to said comparator means with which the output from said amplifier means is compared;
   second sample and hold circuit means connected to said output of said comparator means to detect the difference between the initial voltage and the voltage on said RTD at a time after said RTD is heated and subjected to the fluid flow being sensed;
   indicator means coupled to said output of said second sample and hold circuit means; and
   control means for controlling the timing of the operation of said first and second sample and hold means and said selective connecting means and for providing said reference voltage to said comparator.

24. The sensor recited in claim 23, and further comprising means for providing an indication representative of the voltage across said RTD.

25. The sensor recited in claim 23, wherein said RTD comprises a point sensor.

26. The sensor recited in claim 23, wherein said RTD comprises a plurality of point sensors.

27. The sensor recited in claim 23, wherein said RTD comprises an elongated continuous sensor.

* * * * *